UNITED STATES PATENT OFFICE 2,373,136

ETHYLENE UREA DERIVATIVES

Fred Wayne Hoover and Gordon Theodore Vaala, Wilmington, Del., assignors to E. I. du Pont de Nemours & Company, Wilmington, Del., a corporation of Delaware No Drawing. Application November 23, 1943, Serial No. 511,485

5 Claims. (Cl. 260—309)

This invention relates to new derivatives of ethyleneurea. More particularly it relates to the N-methyleneoxyethyleneureas, i. e., N-hydroxymethylethyleneureas and ethers thereof.

Various urea-type compounds substituted on the nitrogen with hydroxymethyl or alkoxymethyl groups have recently become of considerable technical interest in such applications as creaseproofing or waterproofing agents for textiles, ingredients in adhesive compositions and other important uses. Among such derivatives, the N-hydroxymethyl and alkoxymethyl ureas, urons, and tetrahydrotriazones have been recently proposed. While these compounds are, in general, satisfactory for the uses to which they are put, some of them are difficult and expensive to prepare and others have a tendency to cause side reactions when employed, for example, as insolubilizing agents for polymeric materials.

An object of this invention is to make available a new class of chemical agents characterized by great reactivity, ease of access, and relative cheapness. Another object of this invention is to provide processes for preparing these agents. Other objects will appear hereinafter.

These objects are accomplished by the invention of N-methyleneoxyethyleneureas, i. e., N-hydroxymethylethyleneurea and ethers thereof, and particularly N,N'-bis(hydroxymethyl)ethyleneureas and ethers thereof and of processes for preparing them.

The products of this invention are ethyleneureas having on at least one of the annular urea nitrogens a hydroxymethyl or etherified hydroxymethyl group. The mono derivatives have the formula

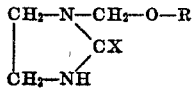

wherein X and R have the values given below.

The preferred products of this invention have the general formula

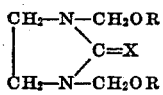

wherein X is a chalcogen (J. Am. Chem. Soc. 63, 892 (1941)) of atomic weight less than 33, i. e., oxygen or sulfur, and the R's, which may be the same or different, are hydrogen or monovalent aliphatic hydrocarbon radicals which may be saturated or unsaturated, acyclic or cyclic, unsubstituted or substituted by inert groups such as alkoxy, thioether, aryl, etc.

The invention will be better understood by reference to the following illustrative but not limitative examples, in which parts are by weight unless otherwise specified.

Example I

Ethyleneurea (258 parts) is dissolved in 250 parts of methanol. Paraformaldehyde (208 parts) and sodium hydroxide (1 part) are dissolved in 250 parts of additional methanol. The formaldehyde solution is gradually added to the ethyleneurea solution at about 50° C., and the resultant mixture is held at this temperature for one hour. Upon cooling the reaction mixture in an ice bath, a heavy precipitation of white, crystalline N,N'-bis(hydroxymethyl)ethyleneurea occurs. The product is removed by filtration, washed with methanol, and dried in a vacuum desiccator. There is thus obtained 289 parts (80% of the theoretical) of N,N'-bis(hydroxymethyl)ethyleneurea which, upon recrystallization from methanol, melts at 99° C. Nitrogen analysis: Found, 19.20%; calculated, 19.17%.

Example II

A mixture of 10 parts of ethyleneurea (93% pure), 8.75 parts of a 37% solution of formaldehyde, and 3.4 parts of water is brought to homogeneous solution by agitation at room temperature. Solution is complete after about 3 minutes, when an exothermic reaction sets in. The temperature rises to a maximum of about 45° C. within 5 minutes and then recedes gradually. The reaction is essentially complete within a few minutes, as shown by the disappearance of the formaldehyde odor. It is completed by allowing the mixture to stand in a closed container for two days at room temperature. Analysis of a sample shows that there is no uncombined formaldehyde present and analysis of another sample for methylol groups indicates a combined formaldehyde:ethyleneurea molal ratio of 1:1.

Example III

Ethyleneurea (258 parts) is dissolved in 500 parts of methanol. Paraformaldehyde (208 parts) and sodium hydroxide (1.6 parts) are dissolved in 500 parts of additional methanol. The formaldehyde solution is gradually added to the ethyleneurea solution at 50–60° C., and the resultant mixture is held at this temperature for one hour. The reaction solution is then cooled at 20° C. and made slightly acid by the addition of 8 parts of 37% hydrochloric acid in 40 parts of methanol. The solution warms spontaneously to 40° C. and is then allowed to stand one hour at room temperature. The acid is neutralized with sodium hydroxide in methanol and the product distilled under reduced pressure. N,N'-bis(methoxymethyl)ethyleneurea (344 parts, 66% of the theoretical) is obtained distilling at 113–130° C. at 5 mm. pressure. Redistillation yields the purified product, boiling point 104–105° C. at 2 mm., melting point 39° C. Nitrogen analysis: Found, 15.66%; calculated, 16.09%.

*Example IV*

Ethyleneurea (86 parts) is dissolved in 200 parts of butanol at 60° C. Paraformaldehyde (66 parts) and sodium hydroxide (0.8 part) in a few parts of water are dissolved in 150 parts of butanol. The formaldehyde solution is added gradually to the ethyleneurea solution at 60–65° C. and the resultant mixture is held at 50–60° C. for one hour, after which it is cooled to 15° C. and made acid by the addition of 5 parts of 37% hydrochloric acid in 30 parts of butanol. After standing 1½ hours at room temperature, the solution is neutralized with sodium hydroxide, filtered, and distilled under reduced pressure. N,N'-bis(butoxymethyl) ethyleneurea (103 parts, 40% of the theoretical) is obtained distilling at 145–157° C. at 7 mm. pressure. Nitrogen analysis: Found, 11.16%; calculated, 10.86%.

The foregoing examples have described a process for making the N-methyleneoxyethyleneureas using as the starting material ethyleneurea itself. There is, however, another method of arriving at these compounds in which the starting materials are urea and ethylenediamine. This method is illustrated in the following example.

*Example V*

A mixture of 300 parts of urea and 300 parts of ethylenediamine is heated at 140° C. for 7 hours. Ammonia is rapidly evolved, and at the end of this period the clear melt originally formed has set to a white solid. This solid is then heated 2 hours at 200° C. and finally 1 hour at 255–260° C. At this temperature, a cloudy melt forms rapidly and the reaction is stopped at the point where this melt reaches optimum clarity, since, beyond this point, continued heating results in decomposition of the product. The product is then crushed, dissolved in alcohol, and filtered, and the resulting alcohol solution may then be treated as in Examples I, II, and III, to give either the hydroxymethyl or the N,N'-bis (alkoxymethyl) ethyleneurea.

If it is desired to isolate the ethyleneurea from the above-described reaction mixture, the product obtained at the end of the heating period, which is impure ethyleneurea, may be distilled or crystallized, giving pure ethyleneurea in 65–75% yield.

In the preparation of the N-alkoxymethyl-ethyleneurea, any alcohol may be employed such as methyl, ethyl, propyl, isopropyl, butyl, isobutyl, tertiary butyl, octyl, dodecyl, beta-hydroxyethyl, methoxymethyl, ethoxymethyl, methoxyethyl, ethoxyethyl, butoxyethyl, benzyl, allyl, and cyclohexyl alcohols. The chain of carbon atoms in the alcohol may be interrupted by hetero atoms such as oxygen or sulfur. Ethylenethiourea may be used in place of ethyleneurea in the above examples and in the process of this invention, obtaining N,N'-bis(hydroxymethyl)ethylenethiourea in the process of Example I and N,N'-bis(methoxymethyl)ethylenethiourea in that of Example III.

The first phase of the process, i. e., the reaction with formaldehyde, is preferably carried out in the presence of a basic catalyst, i. e., a substance giving a pH of more than 7 to its aqueous solution, such as the alkali and alkaline earth oxides, e. g., sodium hydroxide, potassium hydroxide, barium hydroxide, calcium hydroxide, and organic bases such as triethylamine, pyridine, etc.

The reaction of the N-hydroxymethylethyleneureas with alcohols to form the ethers is carried out in the presence of acidic catalysts, i. e., catalysts whose aqueous solutions have a pH of less than 7, such as hydrochloric acid, sulfuric acid, phosphoric acid, formic acid, citric acid, sodium acid sulfate, sodium acid phosphate, etc.

The N-methyleneoxyethyleneureas of this invention are useful as modifying agents for polymeric materials containing hydroxyl groups, in particular cellulose derivatives, since they react with these hydroxylated polymeric materials to give products having improved resistance to organic solvents and increased softening points. Polymeric materials which can be so improved are, for example, cellulose, cellulose acetate, ethylcellulose, polyvinyl alcohol, polyvinyl butyral resins, hydroxylated rubber, alkyd resins, etc. Natural or artificial cellulosic fibers may be treated with the product of this invention with the result that their resilience and recovery from deformation is increased and their tendency to wrinkle and crease is diminished to a considerable extent. Further, by treating cellulosic materials with the products of this invention, basic nitrogen is incorporated into the fibers and hence better dye receptivity and lightfastness are obtained. A degree of waterproofing is also conferred to the textile materials so treated. Other important uses for the N-methyleneoxyethyleneureas are as ingredients of brake fluid compositions, oxidation inhibitors, and intermediates in the preparation of N,N'-dimethyl-ethylenediamine, by hydrogenation and hydrolysis. They can also be used as plasticizers for cellulose esters such as cellulose acetate and as softeners for cellophane provided that, in such applications, the temperature is kept sufficiently low so that substantially no reaction takes place between the N-methyleneoxyethyleneurea and the cellulosic material.

Water soluble resins are obtained from aqueous solutions of the mono-hydroxymethyl and bis-hydroxymethyl derivatives of ethyleneurea by dehydrating the same under alkaline conditions and heating the residues above 100° C. Dehydration of N-bis-hydroxymethylethyleneurea under vacuum gives a solid which can be repeatedly liquefied when raised to slightly above room temperature. When this product is heated with an equimolecular quantity of urea, a clear fluid, mobile at room temperature, results. The mono- and bis-hydroxymethylethyleneureas, when heated with urea under alkaline conditions in aqueous media give viscous syrups which, upon acidification and heating, yield clear, hard, water-soluble resins. A similar treatment with dimethylolurea instead of urea itself gives slightly thermoplastic, water sensitive resins, those prepared from the monomethylol ethyleneurea being somewhat less water sensitive. A molding powder prepared by impregnating cellulose pulp with an aqueous solution of N-bis-(hydroxymethyl)ethyleneurea gives hard, tough, translucent products when compression molded. The N-methyleneoxyethyleneureas may be used in the impregnation of wood and other substances where there is a need for high resin content in the finished product.

The above description and examples are intended to be illustrative only. Any modification of or variation therefrom which conforms to the spirit of the invention is intended to be included within the scope of the claims.

What is claimed is:

1. An N,N'-bis(alkoxymethyl)ethyleneurea of the formula

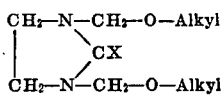

wherein X is a chalcogen of atomic weight less than 33.

2. An N,N'-bis(alkoxymethyl)ethyleneurea of the formula

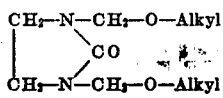

3. N,N'-bis(methoxymethyl)ethyleneurea

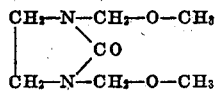

4. Process for the preparation of an ether of an N-hydroxymethylethyleneurea which comprises reacting an ethyleneurea with formaldehyde in the presence of a basic catalyst to obtain the N-hydroxymethylethyleneurea, reacting the same with an alcohol in the presence of an acidic catalyst, and isolating the ether of the N-hydroxymethylethyleneurea.

5. Process of claim 4 wherein the ethylene urea is formed in situ by the reaction of ethylenediamine with urea.

FRED WAYNE HOOVER.
GORDON THEODORE VAALA.